(No Model.)
O. H. JEWELL.
LUBRICATOR.
No. 259,024. Patented June 6, 1882.
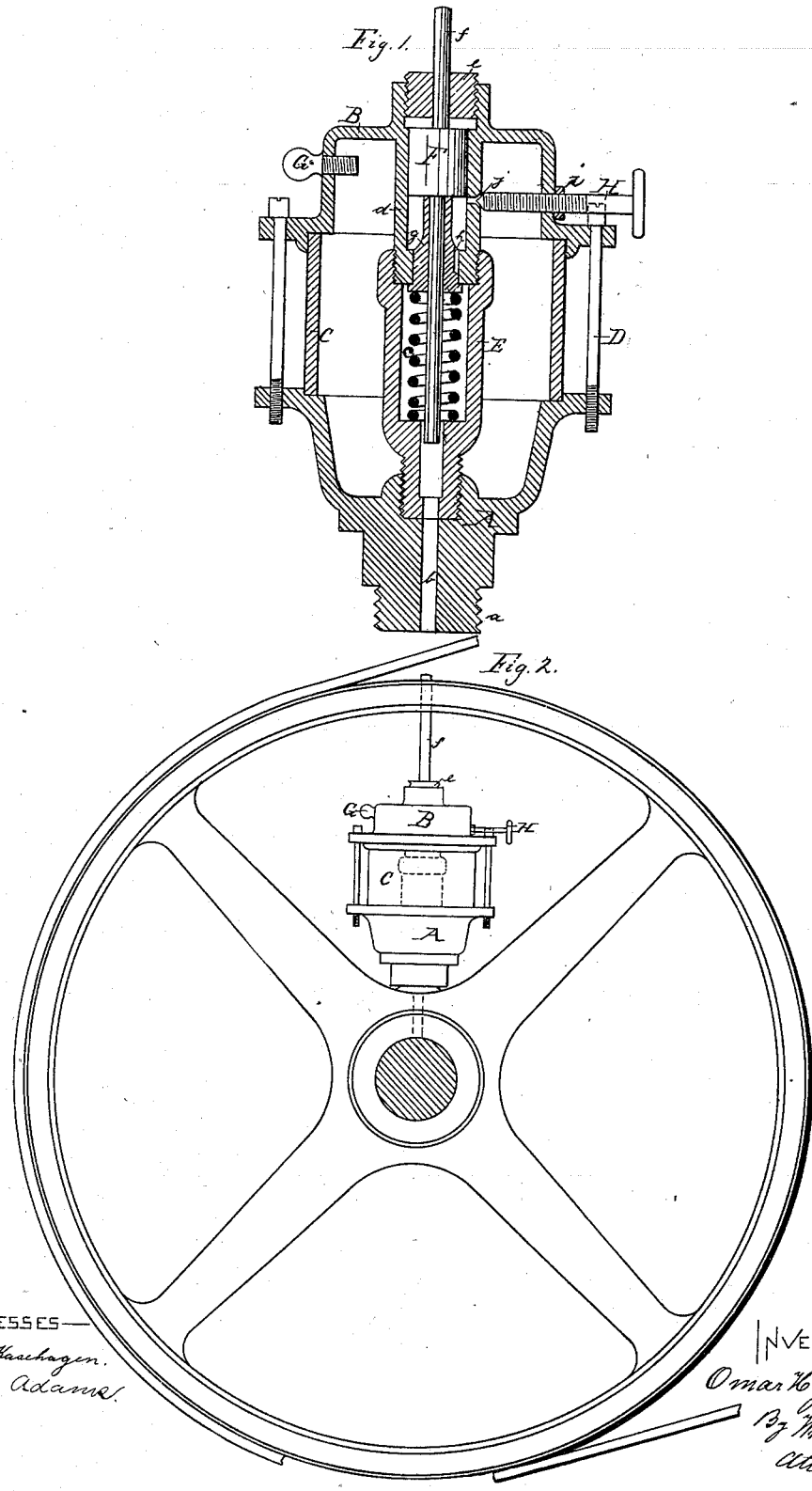

UNITED STATES PATENT OFFICE.

OMAR H. JEWELL, OF CHICAGO, ILLINOIS, ASSIGNOR OF ONE-HALF TO GEORGE A. STANNARD, OF SAME PLACE.

LUBRICATOR.

SPECIFICATION forming part of Letters Patent No. 259,024, dated June 6, 1882.

Application filed March 1, 1882. (No model.)

*To all whom it may concern:*

Be it known that I, OMAR H. JEWELL, of Chicago, in the county of Cook and State of Illinois, have invented certain new and useful Improvements in Lubricators; and I do hereby declare that the following is a full, clear, and exact description thereof, reference being had to the accompanying drawings, and to the letters of reference marked thereon, which form a part of this specification.

The object of this invention is to produce an automatic lubricator for pulleys that turn loose upon their shafts. The only well-working device for uniformly lubricating such pulleys in their hub has been heretofore to pivot the pulley upon a hollow shaft that was perforated inside the pulley-hub, and to feed the oil through one end of the shaft, because a common oil-cup attached to the hub of such pulleys would be prevented by the centrifugal force from letting any oil flow to the shaft.

Now, my invention consists in a lubricator that will overcome these obstacles by making useful the intermittent contact of the belt with any one portion of the pulley-rim to bring about a pumping action, and thereby to force a small and uniform amount of oil to the fulcrum with each revolution of the pulley, all as more fully hereinafter described and specifically claimed.

In the accompanying drawings, Figure 1 represents a sectional view of my lubricator, and Fig. 2 an elevation of a pulley having the lubricator attached.

Like letters designate corresponding parts in all the figures.

A denotes the cup-shaped base; B, the cap, also cup-shaped, and C the glass tube, which is clamped by a series screw-rods, D, between such base and cap, with the joints closed hermetically by intermediate packing-rings. The base A has a screw-threaded stem, $a$, to its bottom, for securing the lubricator to the pulley-hub. Centrally in the top face the base A has a screw-threaded socket and an oil-hole, $b$, that extends from said socket through the center of the stem $a$. Into this socket is screwed the screw-stem of a tubular piece, E, which above such screw-stem is expanded to form a cylindrical chamber for a spiral spring, $c$, and has an internally screw-threaded mouth that connects with the screw-threaded end of a cylinder, $d$. This cylinder $d$ is cast solid with the cap B, and is open at both ends. It is bored out cylindrically, excepting its lower end, which is bored to a smaller diameter, and the top projecting end of the cylinder has an internal screw-thread, and is closed by a screw-plug, $e$.

F is a piston, which is turned to fit close into the cylinder $d$, and so as to reciprocate therein. This piston has a stem, $f$, passed through its center, that extends upward through a hole in the screw-plug $e$ and downward into the tubular piece E, and upon this stem $f$, below the piston F, is sleeved a valve, $g$. This valve $g$ is turned cylindrical on its lower portion, which enters the lower contracted end of cylinder $d$, so as to form a close joint with the bore of said cylinder at that point, and has a flange or shoulder which will butt against the end of such cylinder $d$. The upper end of the valve $g$ is conical, and the upper half of its cylindrical portion has notches or grooves $h$ cut into its periphery. The lower or flanged end of this valve $g$ rests upon the spring $c$, and is pressed by said spring upward into its seat, while its upper or pointed end is in contact with the piston F.

In one side of the wall of cap B is an opening, through which oil is poured into the lubricator, and which is closed by a screw-plug, G.

H is a screw that is tapped through the side wall of cap B, and has a jam-nut, $i$. The pointed end of this screw H enters a countersunk hole, $j$, in the side of cylinder $d$, through which the oil will pass from the supply-chamber into the cylinder $d$ in quantities regulated by adjusting the screw-point more or less toward orifice $j$.

For attaching this lubricator to a loose pulley, its stem $a$ is screwed into the hub, and the upper extension of stem $f$ is made of sufficient length to be passed through a hole in the pulley-rim and to project exteriorly of said rim a sufficient distance, that the belt by passing over such stem will push the same inward, and when released by the belt the spring $c$ will force the stem outward again, when the operation of the lubricator will be as following, to wit: The lubricator being filled with oil and the pulley set in motion, the centrifugal force will hold the oil toward and against the cap B, where, while the belt is not in contact with the end of stem $f$, a small amount of oil will flow into the cylinder $d$ through the orifice $j$. Now, when the belt comes in contact with stem $f$ it forces the piston F downward, which piston, being close over the orifice $j$, will first shut such orifice, and then in passing downward the capacity of the chamber around valve $g$ will be reduced, since the bore of the seat for said valve is smaller than the bore of the cylinder $d$, in which the piston travels, and the valve will slide down within the cylinder, and even further, to make room for the compressed oil in said chamber until the grooves or notches $h$ of valve $g$ communicate with the chamber below said valve, whence through tube E and hole $b$ the desired oil will be forced into the hub of the pulley. After the belt releases the stem $f$ the spring $c$ will reverse the movement of the valve and piston, whereby the capacity of the chamber around the valve $g$ will be increased again, and a partial vacuum will be formed therein that will create a suction and will accelerate the influx of oil through orifice $j$. On account of the centrifugal force the feeding of oil into the hub of the pulley will not begin until all the chambers and channels between the piston F and the bore of the pulley have been filled with oil, and thereafter only so much oil will be fed as is pumped with each stroke of the piston. No oil will be fed into the hub of the pulley, however, by this lubricator unless the belt is on the pulley for driving it.

The above lubricator, as will be readily seen, is simple in its construction, cannot get out of order, and is well adapted for the purpose for which it has been designed.

What I claim is—

1. In a lubricator, the cylinder $d$, having orifice $j$, cap B, screw H, jam-nut $i$, tubular piece E, piston F, stem $f$, spring $c$, and valve $g$, having notches or grooves $h$ in its periphery, the lower end of said valve being arranged to rest upon said spring while its upper end is in contact with the piston F, substantially as and for the purpose set forth.

2. A lubricator secured to the hub of a loose pulley and provided with cylinder $d$, having orifice $j$, cap B, screw H, jam-nut $i$, tubular piece E, piston F, stem $f$, valve $g$, having grooves $h$, and spring $c$, said valve being arranged to rest upon the spring $c$ with its upper end in contact with the piston F, and being pressed up into its seat by said spring, and said stem $f$ being projected through the rim of the pulley to be reciprocated by the alternate contact of the belt, all substantially as and for the purpose set forth.

3. A lubricator consisting of base A, having screw-stem $a$ and oil-hole $b$, of cap B, having cylinder $d$, with orifice $j$ and plug $e$, and of glass tube C, in combination with tubular piece E, piston F, stem $f$, valve $g$, having grooves $h$, and spring $c$, all constructed and arranged substantially as and for the purpose set forth.

4. A lubricator consisting of base A, having screw-stem $a$ and oil-hole $b$, of cap B, having cylinder $d$, with orifice $j$, plug $e$, and regulating-screw H, and of glass tube C, in combination with tubular piece E, stem $f$, piston F, valve $g$, having grooves $h$, and spring $c$, all constructed and arranged substantially as and for the purpose set forth.

In testimony that I claim the foregoing as my invention I affix my signature in presence of two witnesses.

OMAR H. JEWELL.

Witnesses:
F. W. KASEHAGEN,
F. U. ADAMS.